United States Patent
Evans

(10) Patent No.: US 9,345,061 B1
(45) Date of Patent: May 17, 2016

(54) REMOTE ACCESS TO MOBILE COMMUNICATION DEVICES

(75) Inventor: Ethan Z. Evans, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 13/172,500

(22) Filed: Jun. 29, 2011

(51) Int. Cl.
*H04M 3/00* (2006.01)
*H04W 84/12* (2009.01)
*H04W 88/16* (2009.01)

(52) U.S. Cl.
CPC ............. *H04W 84/12* (2013.01); *H04W 88/16* (2013.01)

(58) Field of Classification Search
CPC ..... H04W 4/008; H04W 84/12; H04W 88/16; H04W 76/023; H04W 48/02; H04W 48/20; H04W 4/005; H04W 52/0229; H04W 52/027; H04W 92/10; H04W 92/18; H04L 67/10; H04L 63/1416; H04L 63/20; H04L 67/306
USPC ........................ 455/419, 418, 420, 566, 550.1
See application file for complete search history.

(56) References Cited

U.S. PATENT DOCUMENTS

| | | | |
|---|---|---|---|
| 8,081,963 B2* | 12/2011 | Aftab et al. ................. | 455/419 |
| 2003/0200290 A1* | 10/2003 | Zimmerman et al. ........ | 709/222 |
| 2007/0259657 A1* | 11/2007 | Cheng ........................... | 455/419 |
| 2009/0055157 A1* | 2/2009 | Soffer ............................. | 703/27 |
| 2009/0254778 A1* | 10/2009 | Huang et al. .................. | 714/38 |

OTHER PUBLICATIONS

U.S. Patent Application entitled "Remotely Emulating Computing Devices," filed on May 24, 2011 and assigned U.S. Appl. No. 13/114,534.

* cited by examiner

*Primary Examiner* — Nimesh Patel
(74) *Attorney, Agent, or Firm* — Thomas | Horstemeyer, LLP

(57) ABSTRACT

Disclosed are various embodiments that facilitate remote access to mobile communication devices. A video signal and an audio signal that may be generated in a phone device are captured. The video signal may correspond to a screen of the phone device. The signals are encoded into a media stream, which is sent to a computing device. Input data is obtained from the computing device, and the input data is provided to one or more applications executed in the phone device.

30 Claims, 8 Drawing Sheets

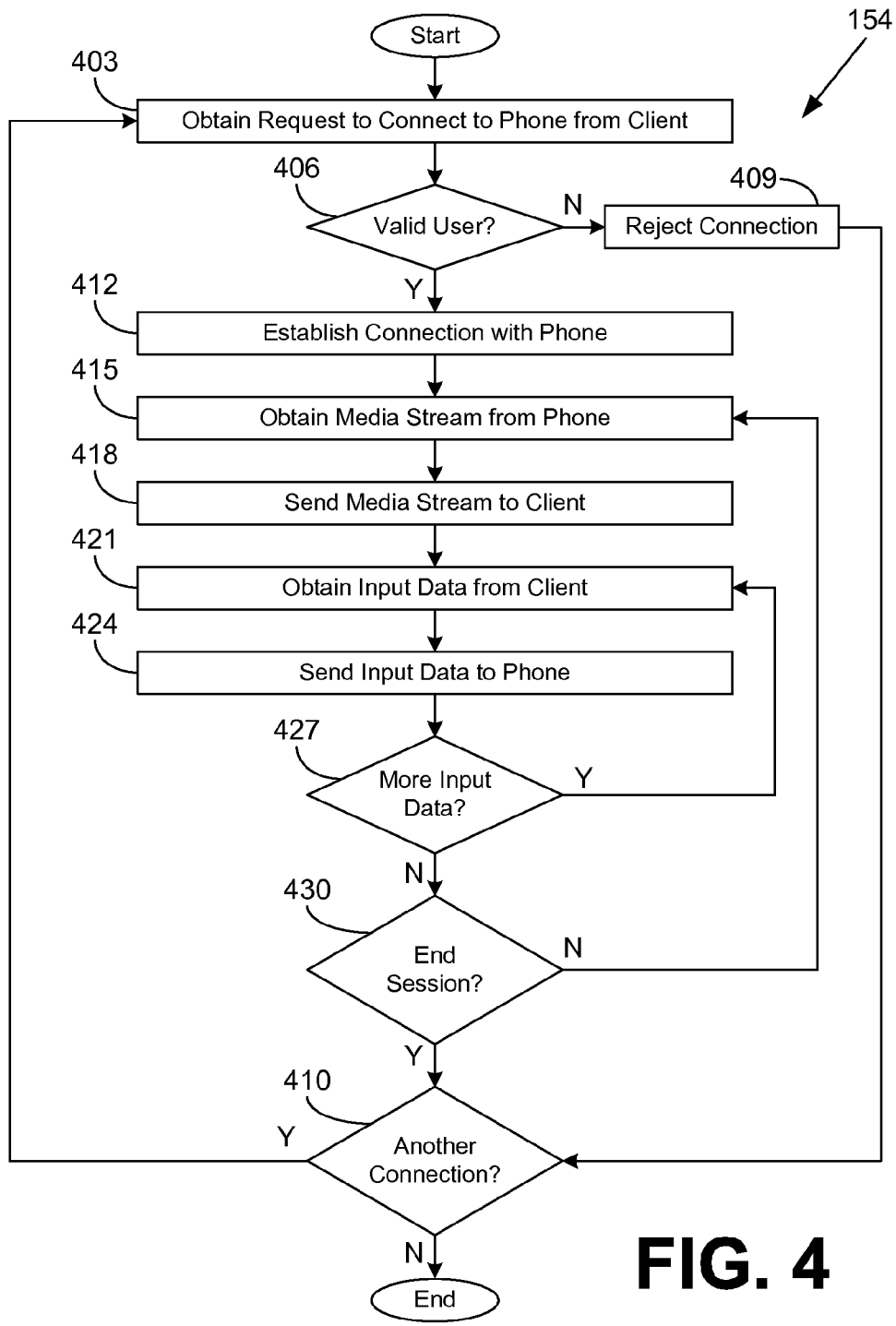

REMOTE ACCESS TO MOBILE COMMUNICATION DEVICES

BACKGROUND

Mobile phones have become ubiquitous in recent years. People have come to rely on mobile phones to the point that they are quickly replacing traditional landline phone services. Short message service (SMS) text messaging has also become popular. Mobile phone technology has also experienced great advancements in recent years. Personal digital assistant (PDA) technology has merged with the mobile phone, resulting in the smartphone.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 4 is a flowchart illustrating one example of functionality implemented as portions of a server application executed in a computing device in the networked environment of FIG. 1 according to various embodiments of the present disclosure.

DETAILED DESCRIPTION

The present disclosure relates to facilitating remote access to mobile communication devices such as smartphones, satellite phones, marine radios, and other mobile communication devices. For a variety of reasons, people may want to place calls or send text messages from their mobile telephones remotely. As a non-limiting example, a person may be traveling internationally and mobile telephone access may be unavailable or otherwise prohibitively expensive. Nonetheless, access to the Internet may be available. Although various voice over internet protocol (VoIP) services may be employed, users are not able to configure such services to use their mobile telephone number for caller identification. Consequently, friends or other contacts of the users may be reluctant to answer the call if the caller identification does not reflect a known number.

Various embodiments of the present disclosure allow users to access their mobile phones and/or other mobile communication devices remotely, which may allow the users to place calls and send text messages from their mobile phones or other devices from any location with network access. Accordingly, the caller identification for such calls or text messages is set to the mobile phone or communication device of the respective user because the mobile phone is, in fact, originating the call on the cellular network. Furthermore, users may remotely access important data stored on their mobile phones or other communication devices, such as contact data and so on. In some embodiments, supervisory users may access the personal mobile phones or other communication devices of other users for audits, monitoring, support, and/or other purposes. In the following discussion, a general description of the system and its components is provided, followed by a discussion of the operation of the same.

Figure 1:
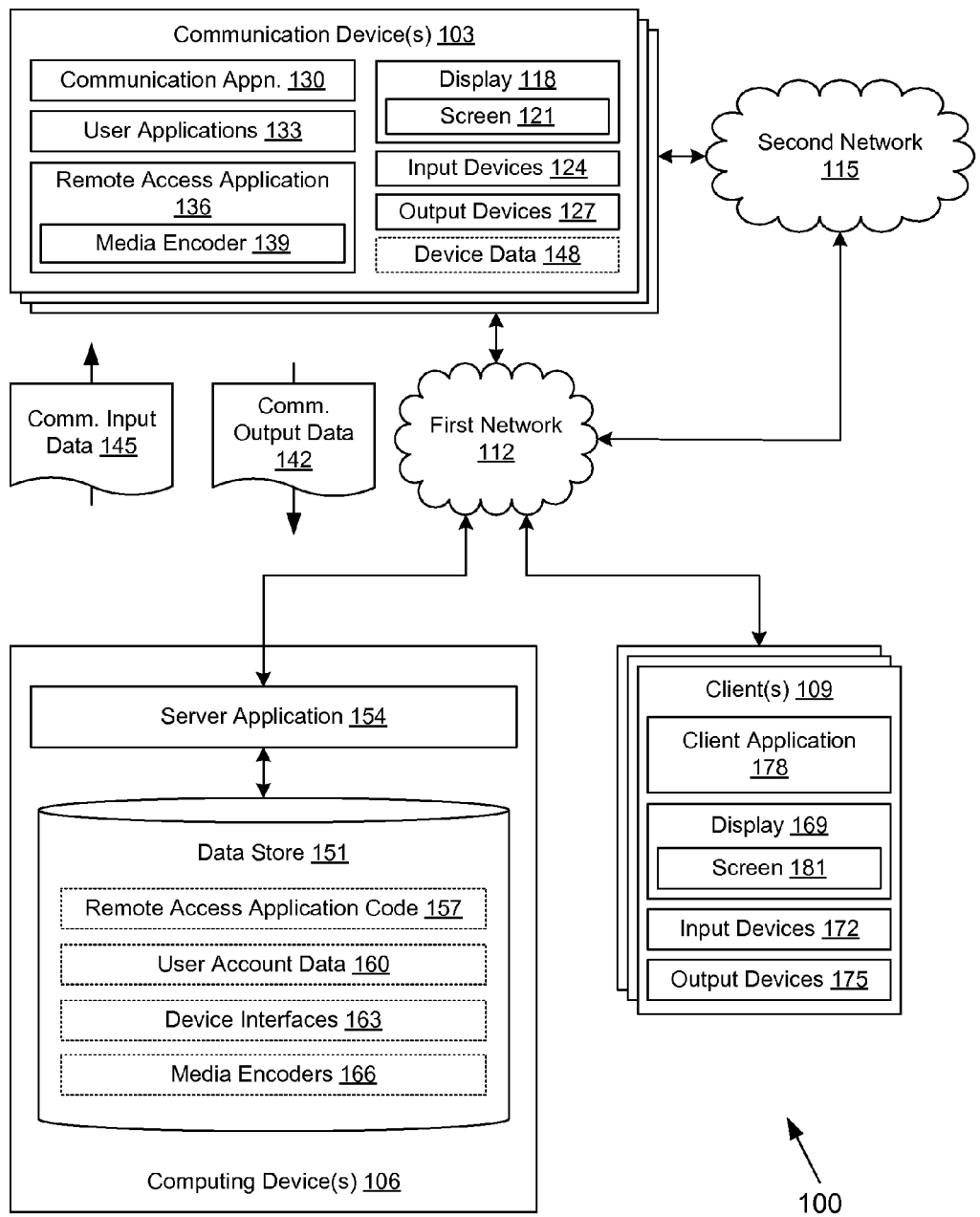
FIG. 1 is a drawing of a networked environment according to various embodiments of the present disclosure.

With reference to FIG. 1, shown is a networked environment 100 according to various embodiments. The networked environment 100 includes one or more communication devices 103, one or more computing devices 106, and one or more clients 109 in data communication by way of a first network 112. The first network 112 includes, for example, the Internet, intranets, extranets, wide area networks (WANs), local area networks (LANs), wired networks, wireless networks, or other suitable networks, etc., or any combination of two or more such networks. The communication devices 103 may be coupled to a second network 115 such as a cellular network, a marine radio network, a satellite network, an encrypted government network, a universal mobile telecommunications system (UMTS) network, global system for mobile communications (GSM) network, code division multiple access (CDMA) network, or other mobile communications network. The second network 115 may be coupled to the first network 112, but it may be the case that the first network 112 and the second network 115 do not interoperate directly.

The communication devices 103 correspond to processor-based devices with capability to connect to the second network 115 to place and receive telephone calls, short message service (SMS) text messages, email messages, and/or other communications. The communication devices 103 may be coupled to the Internet by way of the second network 115 and/or the first network 112. In one embodiment, a communication device 103 may include a Wi-Fi interface to the first network 112 and may be capable of handling VoIP-based calls over the first network 112. The communication device 103 may correspond to a smartphone, a feature phone, a satellite phone, a marine radio, a government radio, or other type of communications device 103.

The communication device 103 may have a display 118 such as a liquid crystal display (LCD) panel, organic light emitting diode (OLED) panel, or other form of display. The display 118 includes a screen 121 that corresponds to the graphical output of the communication device 103 that may be viewed by a user. In various embodiments, the communication device 103 may have various input devices 124 such as, for example, a touchscreen, fixed keyboard, retractable keyboard, keypad, microphone, digital camera, global positioning system (GPS) device, accelerometer, infrared transceiver, Bluetooth® transceiver, and/or other input devices. The communication device 103 may also have various output devices 127 such as, for example, audio devices, indicator lights, vibration devices, and so on.

Various applications and/or other functionality may be executed in the communication device 103 according to various embodiments. The components executed on the communication device 103, for example, include a communication application 130, user applications 133, a remote access application 136, and other applications, services, processes, systems, engines, or functionality not discussed in detail herein. The communication application 130 is executed to place and answer telephone calls or other communications over the second network 115. In some embodiments, the communication application 130 may be configured to place and answer telephone calls over the first network 112 using VoIP or another technology, but it is understood that the same caller identification may be employed through the first network 112 as with the second network 115. The communication application 130 may also be employed to send and receive SMS text messages or other text messages over the second network 115 and/or the first network 112 using the same caller identification.

The user applications 133 correspond to various applications that may be executed in the communication device 103. Such user applications 133 may include games, email applications, browser applications, contact management applications, instant message applications, photo editor applications, video creator applications, and/or other applications.

The remote access application 136 is executed to facilitate remote access to the communication device 103 over the first network 112 and/or the second network 115. To this end, the remote access application 136 may capture a video signal corresponding to the screen 121 and an audio signal and transmit the signals to the computing device 106 and/or the client 109. In some embodiments, the remote access application 136 includes one or more media encoders 139 to encode the video signal and/or audio signal into a media stream. The media encoders 139 may correspond to, for example, Moving Pictures Experts Group (MPEG) encoders, H.264 encoders, Flash® video encoders, etc. Such media encoders 139 may be selected according to factors such as, for example, data reduction, encoding quality, latency, etc. In some embodiments, the remote access application 136 may facilitate remote control of the communication device 103 by way of an application programming interface (API) rather than a video signal of a media stream.

The remote access application 136 may send the media stream to the client 109 and/or the computing device 106 in the communications output data 142. The remote access application 136 may also obtain various data from the client 109 and/or the computing device 106 in the communications input data 145. The communications input data 145 may correspond to audio signals, input commands, text message input, and/or other forms of input data. The communication device 103 may also store various data as device data 148. The device data 148 may include, for example, photos, videos, audio files, contact data, saved text messages, saved voicemails, and/or other data.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 151 that is accessible to the computing device 106. The data store 151 may be representative of a plurality of data stores 151 as can be appreciated. The data stored in the data store 151, for example, is associated with the operation of the various applications and/or functional entities described below.

The components executed on the computing device 106, for example, include a server application 154 and other applications, services, processes, systems, engines, or functionality not discussed in detail herein. The server application 154 is executed to generate an interface for clients 109 to interact with the remote access applications 136 on the communication devices 103. To this end, the server application 154 may generate one or more network pages, such as web pages or other forms of network content. The network pages may include the streaming video and/or audio generated by the remote access application 136.

In various embodiments, images of virtual input devices may be rendered in conjunction with the streaming video and/or audio from the communication device 103. For example, a virtual keyboard for the communication device 103 may be included in the network page. An image of the communication device 103 may be included in the network page. The server application 154 may facilitate interaction with the graphical representation of the communication device 103 in conjunction with the remote access application 136. The video captured from the communication device 103 may be surrounded by the image of the communication device 103, as if the video were shown on the display 118 of the communication device 103.

The server application 154 may communicate with the client 109 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the first network 112. In some embodiments, the server application 154 may incorporate a commercially available HTTP server such as Apache® HTTP Server, Apache® Tomcat®, Microsoft® Internet Information Services (IIS), or other servers.

The data stored in the data store 151 includes, for example, remote access application code 157, user account data 160, device interfaces 163, media encoders 166, and potentially other data. The remote access application code 157 corresponds to code that implements the remote access application 136, which may be downloaded from the server application 154 to the communication device 103. The user account data 160 may define various user accounts which may connect the communication device 103 to the server application 154 and allow clients 109 to connect to the communication device 103 by way of the server application 154. The user account data 160 may define multiple user accounts for a given communication device 103. For example, a supervisory account may be defined in the user account data 160 in order to give a parent access to the communication device 103 used by a child.

The device interfaces 163 correspond to images, animations, code, hypertext markup language (HTML), extensible markup language (XML), cascading style sheets (CSS), and/or other data that may be used to generate a graphical representation of a communication device 103. As a non-limiting example, the Android® platform for smartphones may be supported by a multitude of different models of smartphones. Some of the models may have mini-keyboards with a touchscreen, while others may have merely a touchscreen with no physical mini-keyboard. The models may have different controls and casings. Therefore, different device interfaces 163 may be provided for different models of Android® smartphones.

In some embodiments, multiple different device interfaces 163 may be used in conjunction with communication device 103. Further, device interfaces 163 that are different from the actual communication device 103 may be employed. For example, a generic device interface 163 or a device interface 163 corresponding to a different model of communication device 103 may be used. Where the communication device 103 does not include an integrated display, the device interface 163 may include a representation of an external display device showing video generated by the communication device 103. Similarly, other non-integrated external devices that may connect to the emulated computing device (e.g., keyboards, mice, etc.) may be represented by the device interface 163.

Like the media encoders 139, the media encoders 166 may correspond to, for example, Moving Pictures Experts Group (MPEG) encoders, H.264 encoders, Flash® video encoders, etc. Such media encoders 166 may be selected according to factors such as, for example, data reduction, encoding quality, latency, etc.

The client 109 is representative of a plurality of client devices that may be coupled to the first network 112. The clients 109 may be geographically diverse. The client 109 may comprise, for example, a processor-based system such as a computer system. Such a computer system may be embodied in the form of a desktop computer, a laptop computer, personal digital assistants, cellular telephones, smartphones, set-top boxes, televisions that execute applications and can access the first network 112, music players, web pads, tablet computer systems, game consoles, electronic book readers, or other devices with like capability.

The client 109 may include a display 169. The display 169 may comprise, for example, one or more devices such as cathode ray tubes (CRTs), LCD screens, gas plasma-based flat panel displays, LCD projectors, or other types of display devices, etc. The client 109 may include one or more input devices 172 and one or more output devices 175. The input devices 172 may comprise, for example, devices such as keyboards, mice, joysticks, accelerometers, light guns, game controllers, touch pads, touch screens, touch sticks, push buttons, optical sensors, microphones, webcams, and/or any other devices that can provide user input. Additionally, various input devices 172 may incorporate output devices 175 with haptic technologies in order to provide feedback to the user. The output devices 175 may comprise, for example, audio devices, indicator lights, vibration devices, and/or other devices.

The client 109 may be configured to execute various applications such as a client application 178 and/or other applications. The client application 178 is executed to allow a user to launch, join, play, or otherwise interact with a user application 133 or a communication application 130 executed in the communication device 103. To this end, the client application 178 is configured to capture input commands provided by the user through one or more of the input devices 172 and send this input over the first network 112 to the communication device 103 as communications input data 145. The communications input data 145 may also incorporate other data (e.g., GPS data, audio data, etc.) generated by the client 109 for use by the user application 133 and/or the communication application 130. In various embodiments, the client application 178 corresponds to a browser application.

The client application 178 is also configured to obtain communications output data 142 over the first network 112 from the communication device 103 and render a screen 181 on the display 169. To this end, the client application 178 may include one or more video and audio players to play out a media stream generated by a media encoder 139 or a media encoder 166. In one embodiment, the client application 178 comprises a plug-in or other client-side code executed within a browser application. The client 109 may be configured to execute applications beyond the client application 178 such as, for example, browser applications, email applications, instant message applications, and/or other applications. In some embodiments, multiple clients 109 may be employed for one or more users to interact with the communication device 103. As non-limiting examples, some clients 109 may be specialized in display output, while other clients 109 may be specialized in obtaining user input. It is noted that different clients 109 may be associated with different latency requirements which may affect a delay employed before providing input commands to the user applications 133 or communication application 130.

Next, a general description of the operation of the various components of the networked environment 100 is provided. To begin, a user configures a communication device 103 to include the remote access application 136. For example, software may be automatically or manually downloaded from the remote access application code 157 through the server application 154. The user may then enable remote access for user accounts of the communication device 103 or through special user accounts established for the remote access application 136 and potentially through the server application 154. The remote access application 136 begins listening for connections over the first network 112 and/or the second network 115.

The user may then remotely connect to the communication device 103 by way of a client 109 coupled to the first network 112. In one embodiment, the user may be authenticated through the server application 154 in the computing device 106. Alternatively, the user may directly connect to the communication device 103 through the client 109. However, the communication device 103 may employ a dynamic network address, and the dynamic network address may be reported to the server application 154, a dynamic domain name system (DNS) service, and/or another entity on the first network 112.

The server application 154 and/or the communication device 103 may serve up a user interface. In one embodiment, the server application 154 generates one or more network pages that facilitate remote control of the communication device 103. The remote access application 136 encodes a video signal corresponding to the screen 121 and an audio signal corresponding to the output of an audio output device 127 into a media stream. This media stream may be sent to the client 109 directly or relayed by way of the server application 154 as communications output data 142.

The client application 178 may be configured to render the media stream on the screen 181. In some embodiments, a graphical representation of the communication device 103 may also be rendered to facilitate input/output outside of the screen 121. The graphical representation may correspond to a device interface 163. The user may be able to use an input device 172 of the client 109 to select graphical user interface elements of the screen 121 and/or enter text or other input. Such input may be sent to the communication device 103 as communications input data 145. In one case, the user may use a microphone input device 172 to record an audio signal which is sent to the communication device 103 as communications input data 145.

As a non-limiting example, a user may initiate and/or answer a telephone call remotely with the communication device 103 by using the client 109 in conjunction with the remote access application 136. The caller identification of the communication device 103 is employed because the communication device 103 is actually making or receiving the call. In other examples, a user may seek to have remote access to device data 148 or other user applications 133 of the device. A user may obtain remote access to contact information, stored text messages, and/or other device data 148. In addition, a supervisory user, such as a parent, employer, et al., may access the communication device 103 for auditing, monitoring, support, and/or other reasons. For example, a parent may wish to view text messages sent or received by a child, listen in on telephone calls handled by the communication device 103, and so on.

Various techniques related to facilitating access to applications that are executed remotely are described in U.S. patent application entitled "Remotely Emulating Computing Devices," filed on May 24, 2011 and assigned application Ser. No. 13/114,534, which is incorporated herein by reference in its entirety.

Figure 2A:
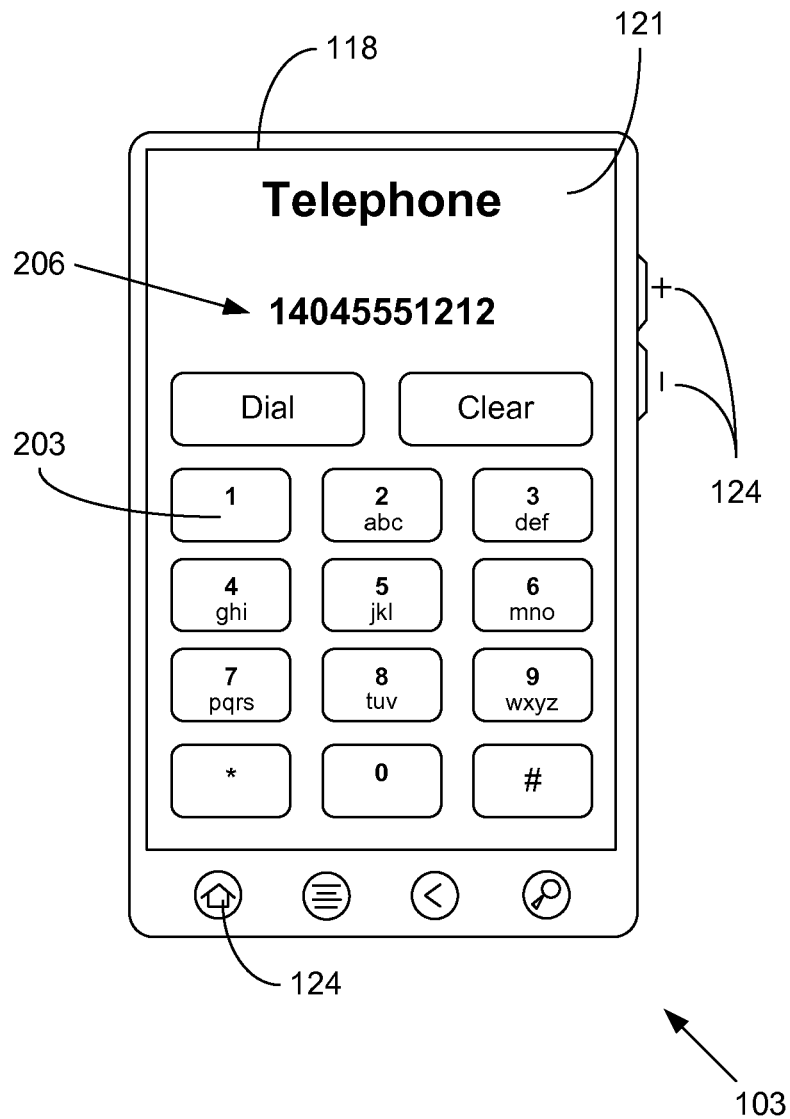
FIG. 2A is a drawing of an example of a communication device in the networked environment of FIG. 1 according to various embodiments of the present disclosure.

Moving on to FIG. 2A, shown is one example of a communication device 103 employed in the networked environment 100 (FIG. 1). The communication device 103 includes a touchscreen display 118 (FIG. 1) that is rendering a screen 121. The communication device 103 includes various input devices 124 such as buttons and other input devices. Some buttons may adjust the volume of an audio device of the communication device 103.

The screen 121 in this example shows the user interface of a communication application 130 (FIG. 1) that facilitates placing and answering telephone calls through the communication device 103. To this end, the screen 121 renders several virtual buttons 203 corresponding to digits and letters. Virtual buttons 203 may be provided to initiate a call using the entered number or to clear the previously entered numbers. A status display 206 is provided to show a status, including, for example, a currently entered telephone number, text message, etc.

Figure 2B:
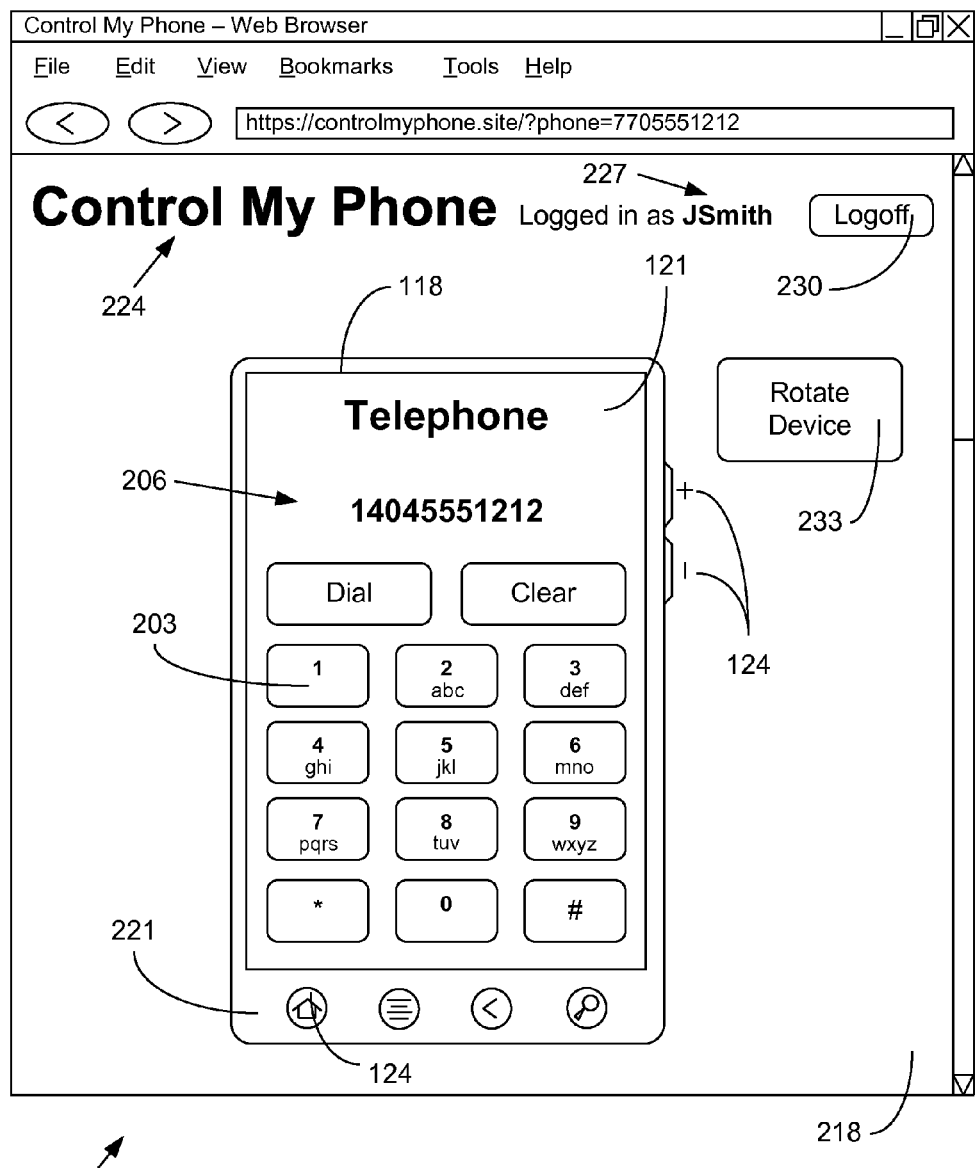
FIG. 2B is a drawing of an example of a user interface rendered in a client in the networked environment of FIG. 1 according to various embodiments of the present disclosure.

Continuing to FIG. 2B, shown is one example of a user interface 212 rendered in a client 109 (FIG. 1) employed in the networked environment 100 (FIG. 1). The user interface 212 corresponds to a client application 178 (FIG. 1) such as a browser application, which is rendering a network page 218 generated by the server application 154 (FIG. 1). The network page 218 shows a graphical representation 221 of the communication device 103 shown in FIG. 2A. The screen 121 is identical to the screen 121 shown in FIG. 2A.

In one embodiment, the screen 121 may correspond to a video signal of a media stream generated in the communication device 103. In another embodiment, both the screen 121 and the graphical representation 221 may be included in a video signal of the media stream. In other embodiments, the graphical representation 221 may be absent. For example, the user interface 212 may show only the screen 121, and where the client 109 is also a communication device 103, the client 109 may have an appearance similar to the example of FIG. 2A, although a remote communication device 103 is being controlled. In still other embodiments, a network page or other application-based interface may be used to control the communication device 103 without showing a screen 121 of the communication device 103.

A heading 224 of the network page 218 identifies the server application 154, which corresponds to a "Control My Phone" service. A user identifier 227 shows that a user with the user name "JSmith" is currently logged into the server application 154 and to the communication device 103. A logoff component 230 may be provided for the user to end the session. One or more additional controls 233 may be provided to generate input data or commands outside of the graphical representation 221 and the screen 121. For example, a rotate device control 233 may allow for the graphical representation 221 to be rotated and for accelerometer input to be presented to the communication device 103.

In the example of FIG. 2B, a user is able to press virtual buttons 203 on the screen 121 from the client 109. For example, the user may use a mouse cursor to click on the virtual buttons 203. The client application 178, the server application 154, and/or the remote access application 136 may be configured to translate this input command into a touchscreen input to press the buttons shown on the graphical representation 221 through an API or another interface (e.g., using virtualized input devices 124).

Accordingly, the user is able to initiate a telephone call using the communication device 103. The user may speak into a microphone on the client 109, thus generating an audio signal, which is sent to the server application 154 and/or directly to the communication device 103. The audio signal is sent to the communication device 103 as communications input data 145 (FIG. 1). The communication device 103 uses the audio signal as the local end of a telephone call. The communication device 103 encodes the remote end of the telephone call into the media stream, which is ultimately returned to the client 109 to be rendered through an audio output device 175 of the client 109. In this example, a user is able to place calls using the client 109 where the calls have the same caller identification as the communication device 103.

Figure 3A:
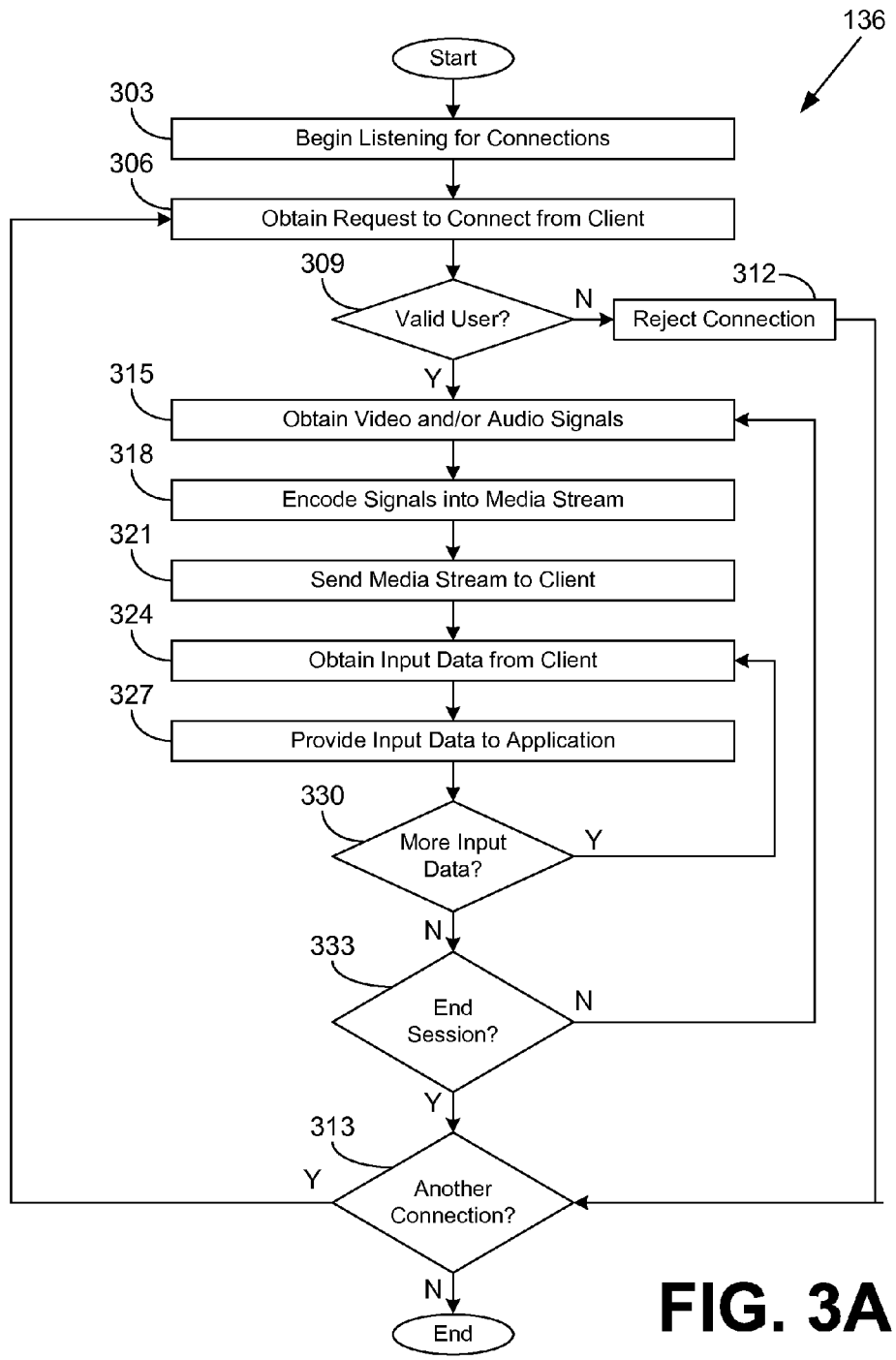
FIGS. 3A and 3B are flowcharts illustrating examples of functionality implemented as portions of a remote access application executed in a communication device in the networked environment of FIG. 1 according to various embodiments of the present disclosure.

Referring next to FIG. 3A, shown is a flowchart that provides one example of the operation of a portion of the remote access application 136 according to various embodiments. It is understood that the flowchart of FIG. 3A provides merely an example of the many different types of functional arrangements that may be employed to implement the operation of the portion of the remote access application 136 as described herein. As an alternative, the flowchart of FIG. 3A may be viewed as depicting an example of steps of a method implemented in the communication device 103 (FIG. 1) according to one or more embodiments.

Beginning with box 303, the remote access application 136 begins listening for connections. For example, the remote access application 136 may be explicitly launched by a user who anticipates accessing the communication device 103 remotely. Alternatively, the remote access application 136 may be configured by the server application 154 (FIG. 1) to enable remote access when desired.

In box 306, the remote access application 136 obtains a request to connect from a client 109 (FIG. 1) or a server application 154. In various embodiments, the remote access application 136 may be configured to communicate with clients 109 and/or the server application 154. In box 309, the remote access application 136 determines whether the connection request is associated with a valid user. For example, the connection request may be associated with security credentials, and the remote access application 136 may authenticate the connection request according to provided security credentials. In some embodiments, some or all of the authentication procedure for clients 109 may be performed on behalf of the clients 109 by the server application 154.

If the connection request is not associated with a valid user, the remote access application 136 continues to box 312 and rejects the connection. The remote access application 136 then proceeds to box 313 and determines whether another connection request is to be obtained. If no other connection request is to be obtained, the portion of the remote access application 136 ends. Otherwise, the remote access application 136 returns to box 306 and obtains another connection request.

If the remote access application 136 instead determines in box 309 that the connection request is associated with a valid user, the remote access application 136 accepts the connection and proceeds from box 309 to box 315. In box 315, the remote access application 136 obtains video and/or audio signals generated in the communication device 103. For example, the video signal may correspond to the screen 121 (FIG. 1) or to the graphical output of the communication application 130 (FIG. 1) and/or the user applications 133 (FIG. 1). The audio signal may correspond to the audio output of the communication device 103, the communication application 130, and/or the user applications 133.

In box 318, the remote access application 136 encodes the video and/or audio signals into a media stream using one or more media encoders 139 (FIG. 1). In one embodiment, the video signal may be modified to include a graphical representation of the communication device 103 and/or other features such as controls. In box 321, the remote access application 136 sends the media stream to the client 109 or the server application 154. In box 324, the remote access application 136 obtains input data that is generated in the client 109 directly from the client 109 or indirectly from the server application 154. The input data may include an audio signal, control commands, text, and/or other data. In box 327, the remote access application 136 provides the input data to the communication application 130 and/or the user applications 133.

In box 330, the remote access application 136 determines whether more input data is to be obtained. If more input data is to be obtained, the remote access application 136 returns to box 324 and obtains the input data. If more input data is not to be obtained, the remote access application 136 instead proceeds to box 333. In box 333, the remote access application 136 determines whether the session is to be ended. If the session is not to be ended, the remote access application 136 returns to box 315 and continues to obtain the video and/or audio signals. If the session is to be ended, the remote access application 136 ends the session and continues to box 313. In box 313, the remote access application 136 determines whether another connection request is to be obtained. If another connection request is to be obtained, the remote access application 136 returns to box 306 and obtains another connection request. If no other connection request is to be obtained, the portion of the remote access application 136 ends.

Figure 3B:
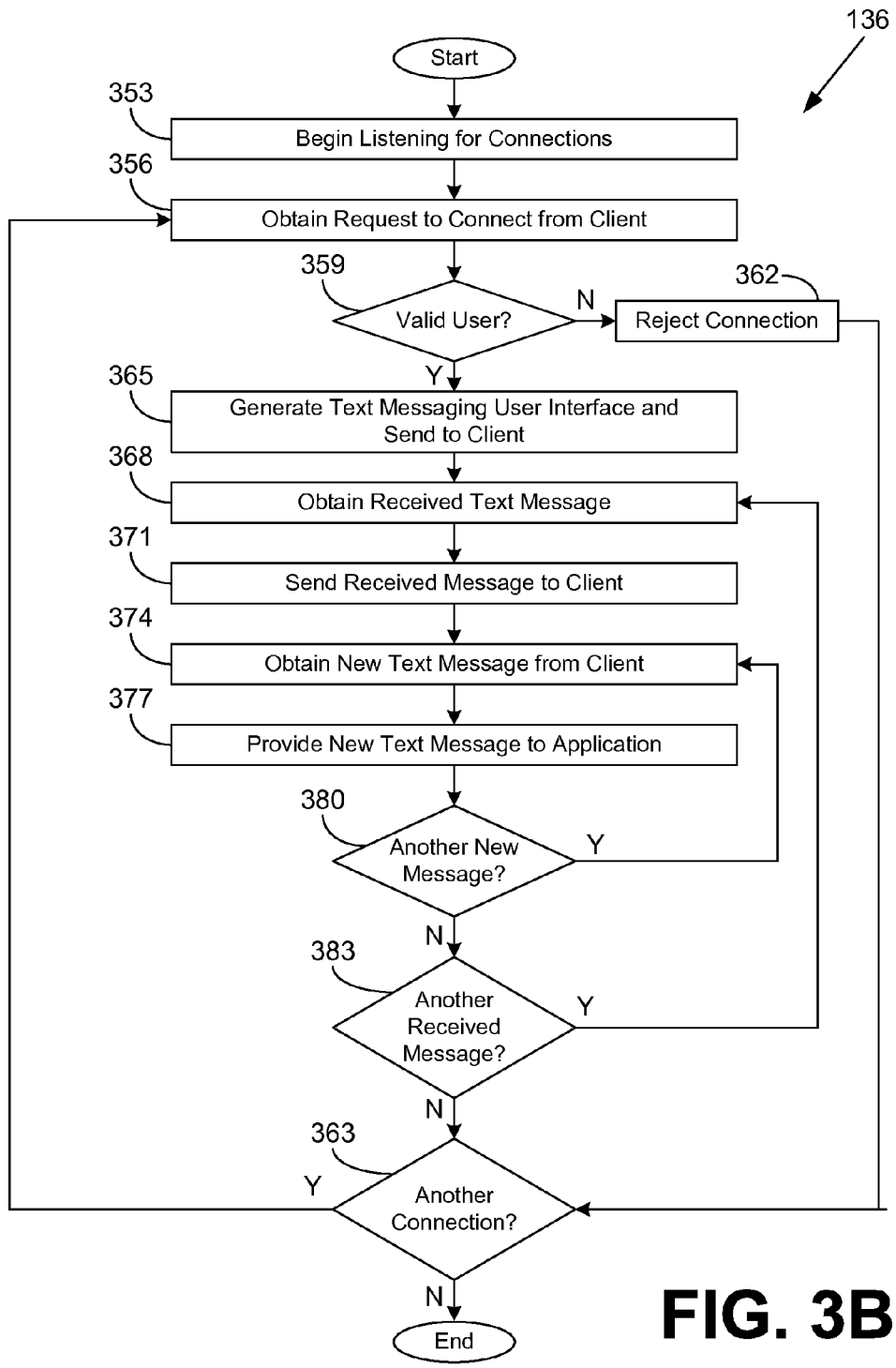

Moving on to FIG. 3B, shown is a flowchart that provides another example of the operation of another portion of the remote access application 136 according to various embodiments. It is understood that the flowchart of FIG. 3B provides merely an example of the many different types of functional arrangements that may be employed to implement the operation of the portion of the remote access application 136 as described herein. As an alternative, the flowchart of FIG. 3B may be viewed as depicting an example of steps of a method implemented in the communication device 103 (FIG. 1) according to one or more embodiments.

Beginning with box 353, the remote access application 136 begins listening for connections. For example, the remote access application 136 may be explicitly launched by a user who anticipates accessing the communication device 103 remotely. Alternatively, the remote access application 136 may be configured by the server application 154 (FIG. 1) to enable remote access when desired.

In box 356, the remote access application 136 obtains a request to connect from a client 109 (FIG. 1) or a server application 154. In various embodiments, the remote access application 136 may be configured to communicate with clients 109 and/or the server application 154. In box 359, the remote access application 136 determines whether the connection request is associated with a valid user. For example, the connection request may be associated with security credentials, and the remote access application 136 may authenticate the connection request according to provided security credentials. In some embodiments, some or all of the authentication procedure for clients 109 may be performed on behalf of the clients 109 by the server application 154.

If the connection request is not associated with a valid user, the remote access application 136 continues to box 362 and rejects the connection. The remote access application 136 then proceeds to box 363 and determines whether another connection request is to be obtained. If no other connection request is to be obtained, the portion of the remote access application 136 ends. Otherwise, the remote access application 136 returns to box 356 and obtains another connection request.

If the remote access application 136 instead determines in box 359 that the connection request is associated with a valid user, the remote access application 136 accepts the connection and proceeds from box 359 to box 365. In box 365, the remote access application 136 generates a text messaging user interface. Such a user interface may correspond to a network page or data for use in a network page or other user interface generated in the client 109. The remote access application 136 sends the data corresponding to the user interface to the client 109.

In box 368, the remote access application 136 obtains a received text message from the communication application 130. In box 371, the remote access application 136 sends the received text message to the client 109 or the server application 154. In box 374, the remote access application 136 obtains a new text message that is generated in the client 109 directly from the client 109 or indirectly from the server application 154. In box 377, the remote access application 136 provides the new text message to the communication application 130.

In box 380, the remote access application 136 determines whether another new text message is to be obtained. If another new text message is to be obtained, the remote access application 136 returns to box 374 and obtains the new text message. If another new text message is not to be obtained, the remote access application 136 instead proceeds to box 383. In box 383, the remote access application 136 determines whether another text message is to be received. If another text message is to be received, the remote access application 136 returns to box 368 and obtains the other text message. If another text message is not to be received, the remote access application 136 ends the session and continues to box 363. In box 363, the remote access application 136 determines whether another connection request is to be obtained. If another connection request is to be obtained, the remote access application 136 returns to box 356 and obtains another connection request. If no other connection request is to be obtained, the portion of the remote access application 136 ends.

Turning now to FIG. 4, shown is a flowchart that provides one example of the operation of a portion of the server application 154 according to various embodiments. It is understood that the flowchart of FIG. 4 provides merely an example of the many different types of functional arrangements that may be employed to implement the operation of the portion of the server application 154 as described herein. As an alternative, the flowchart of FIG. 4 may be viewed as depicting an example of steps of a method implemented in the computing device 106 (FIG. 1) according to one or more embodiments.

Beginning with box 403, the server application 154 obtains a request to connect to a communication device 103 (FIG. 1) from a client 109 (FIG. 1). In box 406, the server application 154 determines whether the connection request is associated with a valid user. For example, the client 109 may provide security credentials which are then compared against the user account data 160 (FIG. 1) to authenticate the user. It is noted that the user accounts associated with the communication device 103 in the server application 154 may differ from operating-system-level accounts of the communication device 103 in some embodiments.

If the connection request is not associated with a valid user, the server application 154 rejects the connection request in box 409. In box 410, the server application 154 determines whether another connection request is to be obtained. If another connection request is to be obtained, the server application 154 returns to box 403 and obtains the next connection request. Otherwise, if another connection request is not to be obtained, the portion of the server application 154 ends.

If the server application 154 determines instead that the connection request is associated with a valid, authenticated user, the server application 154 accepts the connection from the client 109 and proceeds from box 406 to box 412. In box 412, the server application 154 establishes a connection with the communication device 103 associated with the user at the client 109. The connection may be established through the first network 112 (FIG. 1) and/or the second network 115 (FIG. 1).

In box 415, the server application 154 obtains a media stream from the communication device 103. In box 418, the server application 154 sends the media stream to the client 109. To this end, the server application 154 may generate one or more network pages that include the media stream. The network pages may include a graphical representation of the communication device 103 generated from the device interfaces 163. The graphical representation may include representations of the output devices 127 of the communication device 103. In one embodiment, the server application 154 may use a media encoder 166 (FIG. 1) to encode another media stream from the media stream and including the graphical representation of the communication device 103.

In box 421, the server application 154 obtains input data from the client 109. The input data may include an audio signal, control commands, text, and/or other data. The input data may include a command defined relative to a graphical representation of the communication device 103 or an integrated input device 124 (FIG. 1) shown on the graphical representation (e.g., a button, keyboard, touchscreen, etc.). In box 424, the server application 154 sends the input data to the communication device 103. In some cases, the input data may be transformed or processed into different input data by the server application 154.

In box 427, the server application 154 determines whether more input data is to be obtained from the client 109. If more input data is to be obtained, the server application 154 returns to box 421 and obtains the additional input data. If more input data is not to be obtained, the server application 154 instead moves from box 427 to box 430. In box 430, the server application 154 determines whether the session is to be ended. If the session is not to be ended, the server application 154 returns to box 415 and continues obtaining the media stream from the communication device 103.

If, instead, the session is to be ended, the server application 154 continues from box 430 to box 410. In box 410, the server application 154 ends the session and determines whether another connection request is to be obtained. If another connection request is to be obtained, the server application 154 returns to box 403 and obtains another connection request. If another connection request is not to be obtained, the portion of the server application 154 ends.

Figure 5:
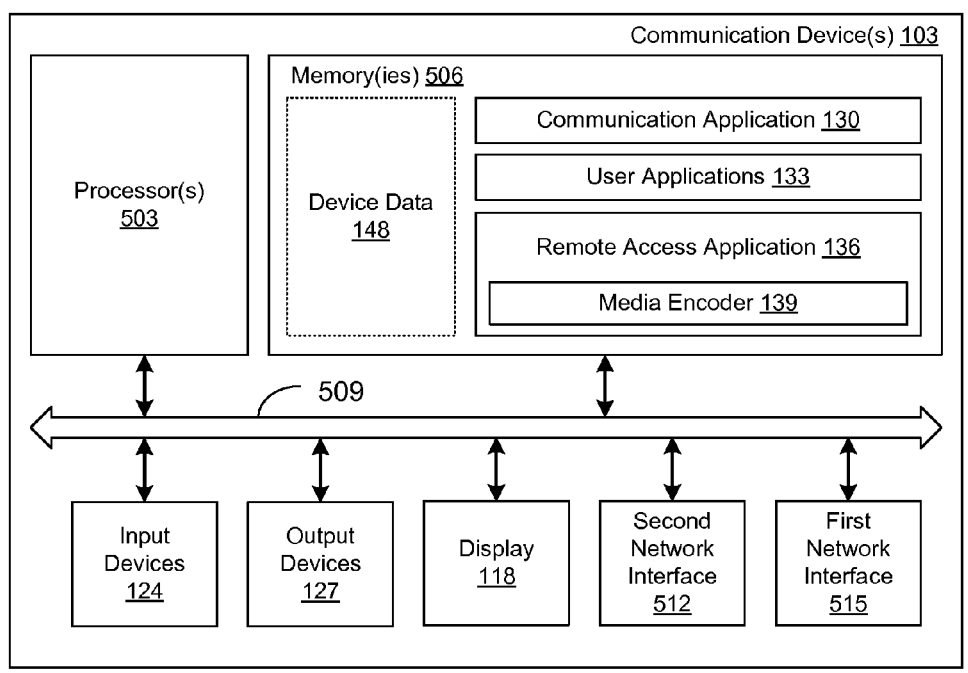
FIG. 5 is a schematic block diagram that provides one example illustration of a communication device employed in the networked environment of FIG. 1 according to various embodiments of the present disclosure.

With reference to FIG. 5, shown is a schematic block diagram of the communication device 103 according to an embodiment of the present disclosure. The communication device 103 includes at least one processor circuit, for example, having a processor 503 and a memory 506, both of which are coupled to a local interface 509. The local interface 509 may comprise, for example, a data bus with an accompanying address/control bus or other bus structure as can be appreciated. The input devices 124, the output devices 127, the display 118, a cellular network interface 512, and a network interface 515 may also be coupled to the local interface 509. The cellular network interface 512 facilitates communication with the second network 115 (FIG. 1). The network interface 515 facilitates communication with the first network 112 (FIG. 1).

Stored in the memory 506 are both data and several components that are executable by the processor 503. In particular, stored in the memory 506 and executable by the processor 503 are the communication application 130, the user applications 133, the remote access application 136, the media encoder 139, and potentially other applications. Also stored in the memory 506 may be the device data 148 and other data. In addition, an operating system may be stored in the memory 506 and executable by the processor 503.

Figure 6:
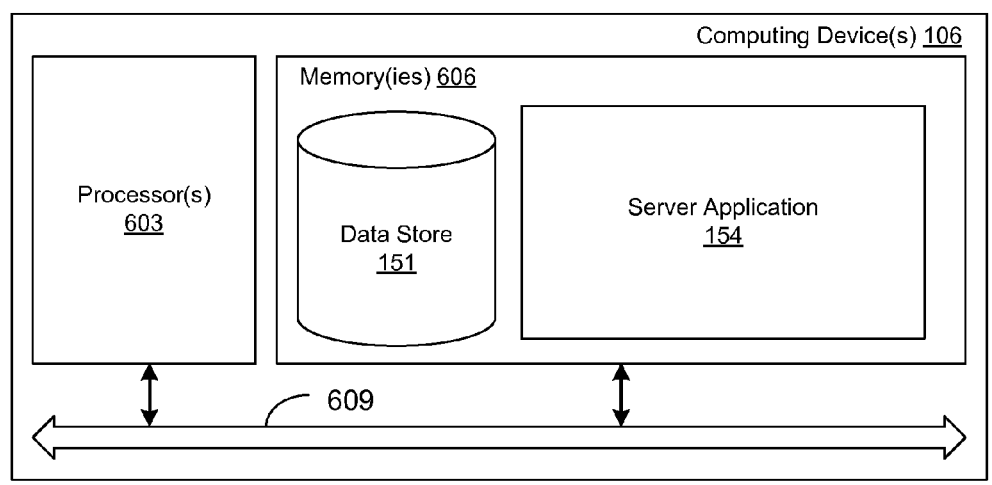
FIG. 6 is a schematic block diagram that provides one example illustration of a computing device employed in the networked environment of FIG. 1 according to various embodiments of the present disclosure.

Referring now to FIG. 6, shown is a schematic block diagram of the computing device 106 according to an embodiment of the present disclosure. The computing device 106 includes at least one processor circuit, for example, having a processor 603 and a memory 606, both of which are coupled to a local interface 609. To this end, the computing device 106 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the server application 154 and potentially other applications. Also stored in the memory 606 may be a data store 151 and other data. In addition, an operating system may be stored in the memory 606 and executable by the processor 603.

With reference to both FIGS. 5 and 6, it is understood that there may be other applications that are stored in the memories 506, 606 and are executable by the processors 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memories 506, 606 and are executable by the processors 503, 603. In this respect, the term "executable" means a program file that is in a form that can ultimately be run by the processors 503, 603. Examples of executable programs may be, for example, a compiled program that can be translated into machine code in a format that can be loaded into a random access portion of the memories 506, 606 and run by the processors 503, 603, source code that may be expressed in proper format such as object code that is capable of being loaded into a random access portion of the memories 506, 606 and executed by the processors 503, 603, or source code that may be interpreted by another executable program to generate instructions in a random access portion of the memories 506, 606 to be executed by the processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 503, 603 may represent multiple processors 503, 603 and the memories 506, 606 may represent multiple memories 506, 606 that operate in parallel processing circuits, respectively. In such a case, the local interfaces 509, 609 may be an appropriate network that facilitates communication between any two of the multiple processors 503, 603, between any processors 503, 603 and any of the memories 506, 606, or between any two of the memories 506, 606, etc. The local interfaces 509, 609 may comprise additional systems designed to coordinate this communication, including, for example, performing load balancing. The processors 503, 603 may be of electrical or of some other available construction.

Although the communication application 130, the user applications 133, the remote access application 136, the media encoder 139, the server application 154, the client application 178 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3A-4 show the functionality and operation of an implementation of portions of the remote access application 136 and the server application 154. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 503, 603 in a computer system or other system. The machine code may be converted from the source code, etc. If embodied in hardware, each block may represent a circuit or a number of interconnected circuits to implement the specified logical function(s).

Although the flowcharts of FIGS. 3A-4 show a specific order of execution, it is understood that the order of execution may differ from that which is depicted. For example, the order of execution of two or more blocks may be scrambled relative to the order shown. Also, two or more blocks shown in succession in FIGS. 3A-4 may be executed concurrently or with partial concurrence. Further, in some embodiments, one or more of the blocks shown in FIGS. 3A-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the communication application 130, the user applications 133, the remote access application 136, the media encoder 139, the server application 154, and the client application 178, that comprises software or code can be embodied in any non-transitory computer-readable medium for use by or in connection with an instruction execution system such as, for example, processors 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, wherein when executed the at least one program causes the at least one computing device to at least:

obtain a first video signal and an audio signal generated in a mobile device, the first video signal corresponding to a screen of the mobile device depicting a game application executed in the mobile device;

generate a second video signal, the second video signal showing a graphical representation of the mobile device, wherein a display screen of the graphical representation of the mobile device shows the first video signal, and the graphical representation of the mobile device includes a graphical representation of an integrated input device of the mobile device;

encode a media stream including the second video signal and the audio signal, the second video signal including the first video signal;

send the media stream to a plurality of client computing devices;

obtain input data from at least one of the client computing devices, wherein the input data includes at least one of a rotation input command, an increase volume input command, or a decrease volume input command to the game application defined relative to the integrated input device of the mobile device; and send the at least one of the rotation input command, the increase volume input command, or the decrease volume input command to the mobile device, wherein the rotation input command causes the graphical representation of the mobile device to be rotated in the media stream sent to individual ones of the plurality of client computing devices, the increase volume input command causes a volume increase for the audio signal, and the decrease volume input command causes a volume decrease for the audio signal.

2. The non-transitory computer-readable medium of claim 1, wherein the audio signal corresponds to a remote end of a telephone call, the input data includes another audio signal, the other audio signal corresponding to a local end of the telephone call, and the at least one program when executed further causes the at least one computing device to at least send the other audio signal to the mobile device.

3. The non-transitory computer-readable medium of claim 1, wherein the graphical representation of the mobile device corresponds to a generic version of the mobile device, and the graphical representation of the integrated input device comprises a plurality of buttons included in the display screen of the generic version of the mobile device.

4. A system, comprising:

a mobile device; and a remote access application executable in the mobile device, wherein when executed the remote access application causes the mobile device to at least:

capture a video signal and an audio signal generated in the mobile device, the video signal corresponding to a screen of the mobile device;

encode the video signal and the audio signal into a first media stream;

send the first media stream to a plurality of computing devices;

obtain input data from at least one of the plurality of computing devices, the input data being generated by way of a user interaction with a second media stream and comprising at least one of a rotation input command, an increase volume input command, or a decrease volume input command, the second media stream including the video signal and a graphical representation of the mobile device, wherein the graphical representation of the mobile device includes a graphical representation of an integrated input device of the mobile device; and provide the input data to at least one application executed in the mobile device, wherein the rotation input command causes the graphical representation of the mobile device to be rotated in the second media stream sent to individual ones of the plurality of computing devices, the increase volume input command causes a volume increase for the audio signal, and the decrease volume input command causes a volume decrease for the audio signal.

5. The system of claim 4, wherein the audio signal corresponds to a remote end of a telephone call, the input data includes another audio signal, and the other audio signal corresponds to a local end of a telephone call.

6. The system of claim 5, wherein the input data includes at least one input command to initiate the telephone call with the mobile device through a cellular network.

7. The system of claim 6, wherein an identity of the mobile device on the cellular network is employed for caller identification of the telephone call.

8. The system of claim 4, wherein the input data includes at least one input command generated from the user interaction with the graphical representation of the integrated input device of the mobile device, and when executed the remote access application further causes the mobile device to translate the at least one input command to a touchscreen input of at least one of a plurality of buttons being pressed on a display screen of the mobile.

9. The system of claim 4, wherein the rotation input command, increase volume input command, or decrease volume input command is generated in association with a graphical element included in the second media stream.

10. The system of claim 4, wherein the video signal includes a text message obtained by the mobile device through a cellular network.

11. The system of claim 4, wherein when executed the remote access application further causes the mobile device to at least send a text message to the plurality of computing devices through a data interface, the text message being obtained by the mobile device through a cellular network.

12. The system of claim 4, wherein the input data includes a text message configured to be sent by the mobile device through a cellular network.

13. The system of claim 4, wherein the at least one of the plurality of computing devices corresponds to a client computing device.

14. The system of claim 4, wherein the at least one of the plurality of computing devices corresponds to at least one server computing device, a server application being executable in the at least one server computing device, wherein when executed the server application causes the at least one server computing device to at least:

obtain the first media stream from the mobile device;

encode a user interface for rendering in a client computing device, the user interface including the graphical representation of the mobile device, wherein the graphical representation of the mobile device is updated in response to the first media stream; and
send the user interface to the client computing device.

15. The system of claim 14, wherein the second media stream is encoded based at least in part on the first media stream, the second media stream including a video signal that shows the graphical representation of the mobile device, the video signal of the first media stream being shown on a display screen of the graphical representation of the mobile device.

16. The system of claim 14, wherein when executed the server application further causes the at least one server computing device to at least:
obtain the input data from the client computing device; and
send the input data to the mobile device.

17. The system of claim 14, wherein the graphical representation of the mobile device includes the graphical representation of the integrated input device of the mobile device.

18. The system of claim 14, wherein when executed the remote access application further causes the mobile device to at least download at least a portion of the remote access application from the server application.

19. A method, comprising:
obtaining, in at least one computing device, a first video signal and an audio signal generated in a mobile device, the first video signal corresponding to a screen of the mobile device;
encoding, in the at least one computing device, a user interface for rendering in a plurality of client computing devices, the user interface including a graphical representation of the mobile device, wherein the graphical representation is updated in response to the first video signal;
encoding, in the at least one computing device, a second video signal that includes the graphical representation and the first video signal, the first video signal being shown in a display screen of the graphical representation;
sending, in the at least one computing device, the user interface, the second video signal, and the audio signal to the plurality of client computing devices;
obtaining, in the at least one computing device, input data comprising at least one of a rotation input command, an increase volume input command, or a decrease volume input command from at least one of the plurality of client computing devices; and
sending, in the at least one computing device, the input data to the mobile device, wherein the rotation input command causes the graphical representation of the mobile device to be rotated in the user interface sent to individual ones of the plurality of client computing devices, the increase volume input command causes a volume increase for the audio signal, and the decrease volume input command causes a volume decrease for the audio signal.

20. The method of claim 19, further comprising verifying, in the at least one computing device, that a user of the at least one of the client computing devices is authorized to access the mobile device.

21. The method of claim 20, wherein the mobile device is associated with a plurality of users, and the user corresponds to a supervisory one of the users.

22. The method of claim 19, wherein the method further comprises:

translating the rotation input command into an accelerometer input; and
sending the accelerometer input to the mobile device.

23. The method of claim 19, wherein the input data includes an input command that is defined relative to the first video signal.

24. The method of claim 19, wherein the audio signal corresponds to a remote end of a telephone call, the input data includes another audio signal, and the other audio signal corresponds to a local end of the telephone call.

25. The method of claim 19, wherein the first video signal depicts at least a portion of a text message.

26. The method of claim 19, wherein the input data includes a text message, and the mobile device is configured to send the text message.

27. A non-transitory computer-readable medium embodying at least one program executable in at least one computing device, wherein when executed the at least one program causes the at least one computing device to at least:
capture a video signal and an audio signal generated in a mobile device, the video signal corresponding to a screen of the mobile device;
encode the video signal and the audio signal into a first media stream;
send the first media stream to a plurality of computing devices;
obtain input data from at least one of the plurality of computing devices, the input data being generated by way of a user interaction with a second media stream and comprising at least one of a rotation input command, an increase volume input command, or a decrease volume input command, the second media stream including the video signal and a graphical representation of the mobile device, wherein the graphical representation of the mobile device includes a graphical representation of an integrated input device of the mobile device; and
provide the input data to at least one application executed in the mobile device, wherein the rotation input command causes the graphical representation of the mobile device to be rotated in the second media stream sent to individual ones of the plurality of computing devices, the increase volume input command causes a volume increase for the audio signal, and the decrease volume input command causes a volume decrease for the audio signal.

28. The non-transitory computer-readable medium of claim 27, wherein when executed the at least one program further causes the at least one computing device to at least:
obtain the first media stream from the mobile device;
encode a user interface for rendering in a client computing device, wherein the graphical representation of the mobile device is updated in response to the first media stream; and
send the user interface to the client computing device.

29. The non-transitory computer-readable medium of claim 28, wherein the second media stream is encoded based at least in part on the first media stream, the second media stream including a video signal that shows the graphical representation of the mobile device, the video signal of the first media stream being shown on a display screen of the graphical representation of the mobile device.

30. The non-transitory computer-readable medium of claim 27, wherein the at least one application comprises a game application executed in the mobile device, and the video signal depicts the game application.

* * * * *